United States Patent Office 3,737,518
Patented June 5, 1973

3,737,518
PROCESS FOR PREPARING HYDROGEN
PEROXIDE
Giovanni A. Bonetti, Wynnewood, Rudolph Rosenthal,
Broomall, Joseph A. Kieras, Lincoln University, and
William B. Wise, Glenolden, Pa., assignors to Atlantic
Richfield Company, New York, N.Y.
No Drawing. Filed Apr. 8, 1971, Ser. No. 132,575
Int. Cl. C01b 15/02; C07c 29/00
U.S. Cl. 423—587                                      4 Claims

ABSTRACT OF THE DISCLOSURE

Hydrogen peroxide is prepared from water and an organic hydroperoxide in the presence of acid at temperatures above about 60° C.

BACKGROUND OF THE INVENTION

Description of the prior art

Hydrogen peroxide is a well known material having a wide variety of known utilities. The major consumption is for use as a bleaching agent of cellulosic materials and other substances such as hair, groundwood, and wood pulp. Other uses are as an oxidizer for vat dyes, a hypo eliminator in photography, separation of metal ions by selective oxidation, an analytical reagent, a depolymerization agent in modification of resins, paper deinking, source of energy which can be released either by decomposition or reaction with a fuel in a fuel cell, foaming agent in manufacture of porous substances such as foam rubber and porous building materials, a source of free radicals, starting material for preparation of most of inorganic and organic peroxy compounds, and reagent in organic chemical synthesis.

Various methods of preparing hydrogen peroxide have been proposed by other workers. Until 1910, it was manufactured exclusively from barium peroxide. The electrolytic processes, involving vaporization of hydrogen peroxide as it is formed by hydrolysis of peroxydisulfuric acid or peroxydisulfates followed by condensation of the product, replaced the barium peroxide processes. The present generally used process is known as the anthraquinone process, involving alternate oxidation and reduction of anthraquinones.

Other recently proposed alternative processes are shown and described in the following U.S. patents: 2,992,071, 2,992,899, 3,003,853, 3,118,733, 3,124,421, 3,317,280, 3,330,626, 3,341,297, 3,336,112, and 3,361,-533. All of these methods have one or more disadvantages, contributing to the continued relatively high cost of hydrogen peroxide.

Recently, a new method for preparing organic 1,2-epoxides such as propylene oxide has become commercial which has as one of its reactants an organic hydroperoxide such as cyclohexyl hydroperoxide, tertiary butyl hydroperoxide, or ethyl benzene hydroperoxide. This has resulted in these organic hydroperoxides becoming much more available than they had been previously since prior art methods for preparing organic hydroperoxides were relatively complex. See, for example, methods shown in Milas et al. U.S. Pats. 2,176,407 and 2,223,807, Milas et al., Journal American Chemical Society, 68, 205 (1946), ibid., 60, 2434 (1938), ibid., 68, 1938 (1946).

Although the reactions of organic hydroperoxides have been deeply studied, see above references and Hoffman et al., Journal American Chemical Society, 77, 3139 (1955), Hawkins, Journal American Chemical Society, 2801 (1950), Kharasch et al., Journal Organic Chemistry, 15, 748 (1950), and Deno et al., Journal Organic Chemistry, 35, 3080 (1970), no one has previously proposed to use these newly available organic hydroperoxides in a process for preparing hydrogen peroxide from water.

SUMMARY OF THE INVENTION

It is therefore an object of this invention to provide a process for preparing hydrogen peroxide from water and an organic hydroperoxide.

It is a further object to provide a process for preparing hydrogen peroxide by a new method which is free of the disadvantages of prior art methods of preparation.

It is a still further object to provide a simple one-step hydrogen peroxide preparation.

These objects, and others as will become apparent, are achieved by the process of this invention which comprises reacting water and an organic hydroperoxide in the presence of a strong acid at a temperature above about 60° C.

DETAILED DESCRIPTION OF THE INVENTION AND THE PREFERRED EMBODIMENTS

More specifically, any organic hydroperoxide can be used. Suitable organic hydroperoxides include aralkyl hydroperoxides, such as ethylbenzene hydroperoxide, diisopropylbenzene mono and di hydroperoxides, Tetralin hydroperoxide, and cumene hydroperoxide, cycloalkyl hydroperoxides such as cyclohexane hydroperoxide, methyl cyclohexyl hydroperoxide, isopropyl cyclohexyl hydroperoxide, alkyl hydroperoxides such as t-butyl hydroperoxide and t-amyl hydroperoxide, cycloalkenyl hydroperoxides such as cyclohexene and methyl cyclohexene hydroperoxides and alkylene hydroperoxides such as isoamylene hydroperoxide. Mixtures of hydroperoxides are also specifically contemplated.

Concentrations of the organic hydroperoxide can be from about one to about fifty weight percent based on the reactants, depending upon the particular system used. The hydroperoxide reacts with the water on an equimolar basis to produce one mole of hydrogen peroxide and one mole of alcohol.

The strong acid used in this invention can be inorganic mineral acids such as sulfuric acid, hydrochloric acid, or phosphoric acids, sources of acid such as potassium acid sulfate or boron phosphate, ion exchange resins in acid form, and the like. Organic acids such as p-toluene sulfonic can also be used. Mixtures of acids are very suitable.

The acid is present in this process in amounts sufficient to catalyze the reaction, optimum amounts being readily determinable for each combination of particular acid, organic hydroperoxide, temperature, and other conditions. Usually, at least one percent by weight based on the acid and water or salt and water is necessary. Up to about 40 percent by weight is suitable. When an excessive concentration of acid is employed, i.e., significantly above 40 weight percent of the acids we have studied, the desired reaction does not take place. We have discovered that the acid concentration is a criticality in obtaining hydrogen peroxide. The preferred range is from about 1 to about 40 percent, more preferably from about 5 to about 35 percent is used.

Elevated temperature is critical to the process of this invention. As with acid, the optimum temperature depends on the particular organic hydroperoxide, acid, and other conditions, but in all cases specifically investigated it has been discovered that at least a temperature of about 60° C. but below the decomposition temperature of the hydrogen peroxide product is necessary. We have concluded that rarely is it possible to get detectable hydrogen peroxide formation from the reaction of water and organic hydroperoxide in the presence of acid at a temperature significantly below about 60° C. A range of from about 60° to 130° C. is preferred, with 75° to 110° C. more preferred.

The pressure can be below, at, or above atmospheric, but since it is preferred to maintain the reaction in the liquid phase, superatmospheric conditions are preferred at certain temperatures with certain reactants.

The reaction time is dependent upon temperature, concentration, and reactants employed, and can be from as little as a few minutes to several hours.

During the reaction, the alcohol corresponding to the organic hydroperoxide employed is generally produced as a by-product. For example, when t-butyl hydroperoxide is used, t-butyl alcohol is co-produced. When cyclohexyl hydroperoxide is used, cyclohexanol is a by-product. These alcohols are easily separated by conventional means from the hydrogen peroxide product, and have well known utilities.

A stabilizer is optionally used to prevent decomposition and to pick up metal contaminants. Suitable ones include sodium pyrophosphate and potassium pyrophosphate.

The following specific examples are presented to illustrate several embodiments of the invention.

EXAMPLE I

A series of runs was made to study the effect of the concentration of sulfuric acid on the reaction of water and t-butyl hydroperoxide to produce hydrogen peroxide. In each run 30 g. water, 4 g. 94 wt. percent t-butyl hydroperoxide, 0.5 g. sodium pyrophosphate along with sufficient concentrated sulfuric acid to make up the concentrations shown in the table was heated at 85° C. The yield of hydrogen peroxide based on the t-butyl hydroperoxide charged and the times required to achieve these yields are shown in the table. Analysis for hydrogen peroxide was by the standard titanium spectrophotometric procedure.

| Conc. aqueous $H_2SO_4$ (wt. percent) | Time (hrs.) | Mole percent conv. to $H_2O_2$ |
| --- | --- | --- |
| 4.8 | 7 | 17.7 |
| 9.1 | 4 | 21.8 |
| 11.7 | 3.5 | 20.3 |
| 15.5 | 3 | 24.8 |
| 17.8 | 2 | 23.8 |
| 20.0 | 1 | 24.7 |
| 33.3 | 0.25 | 22.0 |

EXAMPLE II

A mixture of 30 g. water, 7.5 g. of 94 wt. percent t-butyl hydroperoxide, and 18 g. 85 wt. percent phosphoric acid was heated at 90° C. At the end of one hour 2.5 mole percent conversion to hydrogen peroxide was obtained. After two hours 4.9 mole percent and after four and one-half hours 8.8 mole percent conversion of the t-butyl hydroperoxide charged were obtained.

EXAMPLE III

A mixture of 30 g. water, 9 g. potassium acid sulfate, and 4 g. of 94 wt. percent t-butyl hydroperoxide was heated at 93° C. for six hours. A 17.6 mole percent conversion to hydrogen peroxide was obtained. When the same reaction was carried out in a sealed tube at 110° C. a 15.9 mole percent conversion was obtained in one hour.

EXAMPLE IV

A mixture of 30 g. water, 4 g. of 94 wt. percent t-butyl hydroperoxide, and 3 g. of Amberlyst-15 ion exchange resin in the acid form was heated at 94°°. After three hours a 13.3 mole percent conversion to hydrogen peroxide was obtained. When a similar reaction was carried out in a sealed tube at 110° C. an 11.4 mole percent conversion was obtained in 1.75 hours.

EXAMPLE V

A mixture of 30 g. water, 3 g. concentrated hydrochloric acid, 4 g. of 94 wt. percent t-butyl hydroperoxide, and 0.5 g. sodium pyrophosphate was heated at 85° C. for two hours giving an 8.7 mole percent conversion to hydrogen peroxide.

EXAMPLE VI

A mixture of 30 g. water, 5.5 g. p-toluenesulfonic acid, 4 g. of 94 wt. percent t-butyl hydroperoxide, and 0.1 g. sodium pyrophosphate was heated at 85° C. for two hours giving a 13.1 mole percent conversion to hydrogen peroxide.

EXAMPLE VII

A mixture of 30 g. water, 4 g. boron phosphate, 4 g. 94 wt. percent t-butyl hydroperoxide, and 0.1 g. sodium pyrophosphate was heated at 95° C. for one hour giving a 7.4 mole percent conversion to hydrogen peroxide.

EXAMPLE VIII

This example shows that combinations of acids can also be used. A mixture of 30 g. water, 9 g. 85 wt. percent phosphoric acid, 5.5 g. sulfuric acid, 4 g. 94 wt. percent t-butyl hydroperoxide, and 1 g. sodium pyrophosphate was heated at 85° C. for 1.5 hours giving a 24.6 mole percent conversion to hydrogen peroxide.

EXAMPLE IX

A mixture of 20 g. water, 2.5 g. concentrated sulfuric acid, 0.1 g. sodium pyrophosphate, and 3 g. ethylbenzene hydroperoxide was heated at 85° C. for 15 minutes. A 2.2 mole percent conversion to hydrogen peroxide was obtained.

EXAMPLE X

A mixture of 30 g. water, 4 g. concentrated sulfuric acid, 0.1 g. sodium pyrophosphate and 4.2 g. of 71 wt. percent t-amyl hydroperoxide was heated at 85° C. for 1.5 hours. A 24.0 mole percent conversion to hydrogen peroxide was obtained.

EXAMPLE XI

A mixture of 20 g. water, 2.5 g. concentrated sulfuric acid and 6.0 g. of 81 wt. percent cumene hydroperoxide was heated at 85° C. for 30 minutes. A 12.6 mole percent conversion to hydrogen peroxide was obtained.

The following examples demonstrate that with t-butyl hydroperoxide as the organic hydroperoxide, the reaction does not occur at the lower temperatures:

EXAMPLE XII

A mixture of 30 g. water, 7.5 g. concentrated sulfuric acid and 4 g. 94 wt. percent t-butyl hydroperoxide was stirred at room temperature for seven hours. No hydrogen peroxide was found. The mixture was checked at the end of 24 hours and 96 hours and no hydrogen peroxide was detected.

EXAMPLE XIII

A mixture of 30 g. water, 15 g. concentrated sulfuric acid, 4 g. 94 wt. percent t-butyl hydroperoxide and 1 g. sodium pyrophosphate was stirred at 26° C. for two hours. No hydrogen peroxide was detected.

EXAMPLE XIV

A mixture of 30 g. water, 7.5 g. concentrated sulfuric acid and 4 g. 94 wt. percent t-butyl hydroperoxide was stirred at room temperature for one hour. No hydrogen peroxide was detected. The mixture was then heated at 40° C. for one hour and still showed no hydrogen peroxide. Heating at 60° C. for one hour gave a 4.9 mole percent conversion to hydrogen peroxide. Heating at 80° C. for one hour gave a 15.9 mole percent conversion to hydrogen peroxide. After an additional 0.75 hour at 80° C. a 22.6 mole percent conversion to hydrogen peroxide was obtained.

EXAMPLE XV

A run as in Example 14 was made substituting 7.5 g. 85 wt. percent phosphoric acid for the sulfuric acid. One hour at room temperature gave no hydrogen peroxide. An additional hour at 40° C. and an hour at 60° C. gave no hydrogen peroxide. The mixture was then heated to 80° C. and at the end of one hour at this temperature a 4.5 mole percent conversion to hydrogen peroxide was obtained.

EXAMPLE XVI

A mixture of 30 g. water, 4 g. t-butyl hydroperoxide and 3 g. Amberlyst-15 ion exchange resin in the acid form was stirred at room temperature for one hour. No hydrogen peroxide was found. The mixture was heated at 40° C. for one hour and then at 60° C. for one hour. No hydrogen peroxide was detected. Heating at 80° C. for one hour gave a 2.6 mole percent conversion to hydrogen peroxide.

These examples demonstrate that hydrogen peroxide is a product of the reaction of water with an organic hydroperoxide at a temperature of from about 60° C. to about 130° C. in the presence of an acid.

Various modifications, improvements, and alternative embodiments should be obvious and may be made without departing from the spirit and scope of the invention.

We claim:

1. A method of producing one mole of alcohol plus one mole of hydrogen peroxide consisting essentially of reacting one mole of an organic hydroperoxide and one mole of water at a temperature of from about 60° C. to about 130° C. in an aqueous solution containing an acid in amounts of from about 1 to about 40 weight percent based on acid and water, the organic hydroperoxide being introduced in an amount of from about one to about fifty percent by weight based on the aqueous solution containing said acid, water, and organic hydroperoxide reactants.

2. The method of claim 1 wherein said organic hydroperoxide is selected from the group consisting of ethylbenzene hydroperoxide, cumene hydroperoxide, cyclohexane hydroperoxide, t-butyl hydroperoxide, and t-amyl hydroperoxide and the acid is selected from the group consisting of sulfuric, phosphoric, hydrochloric, p-toluene sulfonic, potassium acid sulfate, and boron phosphate.

3. The method of claim 1 wherein said acid is an ion exchange resin in acid form.

4. The method of claim 1 wherein the temperature is from about 75° C. to about 110° C.

References Cited

UNITED STATES PATENTS

| | | | |
|---|---|---|---|
| 3,653,832 | 4/1972 | Turner | 23—207.5 |
| 2,176,407 | 10/1939 | Milas | 260—610 R |
| 3,484,199 | 12/1969 | Hawkins | 23—207 |
| 3,387,938 | 6/1968 | Leaver | 23—207 |
| 2,593,761 | 4/1952 | Johnston | 260—610 R |

HOKE S. MILLER, Primary Examiner

U.S. Cl. X.R.

260—632